United States Patent
Shiga

(10) Patent No.: US 8,493,675 B2
(45) Date of Patent: Jul. 23, 2013

(54) OSCILLATOR HOLDING MECHANISM, OSCILLATION MOTOR, AND LENS DRIVING DEVICE

(75) Inventor: Naoto Shiga, Saitama (JP)

(73) Assignee: Tamron Co., Ltd., Saitama (JP)

( * ) Notice: Subject to any disclaimer, the term of this patent is extended or adjusted under 35 U.S.C. 154(b) by 67 days.

(21) Appl. No.: 13/333,597

(22) Filed: Dec. 21, 2011

(65) Prior Publication Data
US 2012/0182630 A1 Jul. 19, 2012

(30) Foreign Application Priority Data
Jan. 17, 2011 (JP) .................................. 2011-006559

(51) Int. Cl.
*G02B 7/02* (2006.01)

(52) U.S. Cl.
USPC ......................................................... 359/814

(58) Field of Classification Search
USPC .. 359/811, 813, 814, 819, 822, 824; 310/311, 310/314, 317, 323.09, 323.16, 328
See application file for complete search history.

(56) References Cited

U.S. PATENT DOCUMENTS

| 7,816,840 | B2 * | 10/2010 | Tang et al. | ............... 310/323.18 |
| 2008/0174206 | A1 | 7/2008 | Sakamoto | |

FOREIGN PATENT DOCUMENTS

| JP | 2008178250 A | 7/2008 |
| JP | 4182588 B2 | 9/2008 |
| JP | 2010206907 A | 9/2010 |

* cited by examiner

*Primary Examiner* — Tuyen Tra
(74) *Attorney, Agent, or Firm* — The Webb Law Firm

(57) ABSTRACT

An oscillator holding mechanism capable of generating a stable vibration in an oscillator and an oscillation motor having the oscillator holding mechanism are disclosed. The oscillator holding mechanism present within an oscillation motor includes an oscillator that has a protruding output section on one end that generates a predetermined movement in the output section by vibration, a holding member that holds and accommodates the oscillator, and a buffer member that is made of an elastic material and is provided between the oscillator and the holding member. The buffer member has a first surface in contact with the holding member having a larger area than a second surface in contact with the oscillator and a cross sectional shape including a center axis that connects a center point of the first surface and a center point of the second surface that is axisymmetric with respect to the center axis.

8 Claims, 3 Drawing Sheets

(a)

(b)

US 8,493,675 B2

OSCILLATOR HOLDING MECHANISM, OSCILLATION MOTOR, AND LENS DRIVING DEVICE

BACKGROUND OF THE INVENTION

1. Field of the Invention

The present invention relates to an oscillator holding mechanism for holding an oscillator in an oscillation motor.

2. Background Art

Oscillation motor is a device which makes an oscillator having an output section vibrate to generate a rotational movement in an elliptical pattern or the like in the output section, and transmit the power to a driven body by a frictional force between the output section and the driven body by bringing the output section into contact with the driven body. Among the oscillation motors, an ultrasonic motor is suitable for reduction in size and weight because of excellent-torque at low-revolution and excellent silence. Thus, the ultrasonic motors are used as a driving source of a movable mechanism in an auto-focusing function of camera or in a scanning electron microscope or the like which requires precise positioning.

In practice, the oscillation motor generate one natural vibration or two different natural vibrations at a predetermined frequency and a predetermined timing in the oscillator having the output section, and thereby generate the rotational movement in an elliptical pattern or the like or a reciprocating movement in the output section. For example, when a bending vibration and a longitudinal vibration are generated in the oscillator and the bending vibration and the longitudinal vibration are matched in natural frequency to each other but excited respectively at predetermined timings, the rotational movement in an elliptical pattern or the like is generated in the output section. The driven body is drove by bringing the driven body into contact with the output section, and the rotational movement of the output section is transmitted to the driven body by the frictional force therebetween.

Thus, the oscillator equipped in the oscillation motor is held by a base member or the like of the oscillation motor in a state in which a fine vibration can be generated in the oscillator. For example, in an oscillation motor unit disclosed in Japanese Patent Laid-Open No. 2010-206907 proposed by the present applicant, an oscillator is held in an oscillator holder that is provided independent from a base member. The oscillator holder disclosed in Japanese Patent Laid-Open No. 2010-206907 is composed of a frame body that accommodates the oscillator in a groove-like accommodating section formed such that a protrusion for transmitting the vibration of the oscillator and an opposing side surface are exposed from the oscillator holder.

Japanese Patent Published No. 4182588 also discloses a configuration in which an oscillator is held between two opposing protrusions provided by bending a portion of a base member at 90 degrees. In practice, a support member having a square U shape in longitudinal section, the oscillator and a backlash-eliminating spring are arranged in this order between the two opposing protrusions. The oscillator is held in contact with the support member by a spring force generated by the backlash-eliminating spring. Further, Japanese Patent Laid-Open No. 2008-178250 discloses a configuration in which a guide pin is inserted into a groove formed in a holder for holding an ultrasonic oscillator of an ultrasonic motor, to restrict the travel of the ultrasonic oscillator in the holder.

The vibration of the oscillator is preferable to be converted only into a predetermined movement at the output section.

However, a slight movement other than the preferable movement is generated in the practical conditions. In addition, a small gap may also exist between a holding member such as the oscillator holder and the oscillator due to deviation of accuracy in finishing of components. The above matters may affect on the vibration of the oscillator, to thereby cause a fluctuation in the movement of the output section to increase power consumption due to decrease of efficiency in output transmitting.

In Japanese Patent Laid-Open No. 2010-206907 and Japanese Patent Publication No. 4182588, the above problems cannot be solved since a large area side surface among the side surfaces of the oscillator which has a flat rectangular solid shape, a rectangular plate-like shape or the like are not held and it makes reduction of vibration fluctuation during bending vibration of the oscillator hard. Next, in the oscillation motor disclosed in Japanese Patent Laid-Open No. 2008-178250, the guide pin as a holding member is arranged on the same surface where the oscillator is pressed toward a driven member, i.e. its hold only the pressing surface and a gap between the other surfaces and the holder in the holding mechanism may exist. In a method of holding the oscillator in the conventional oscillation motors, vibration fluctuation during longitudinal vibration of the oscillator cannot be reduced, i.e. the problems described above cannot be solved.

Then, an object of the present invention is to provide an oscillator holding mechanism which enables generation of a stable vibration in an oscillator by appropriately holding the oscillator in an oscillation motor, and an oscillation motor comprising the oscillator holding mechanism.

SUMMARY OF THE INVENTION

Figure 1:
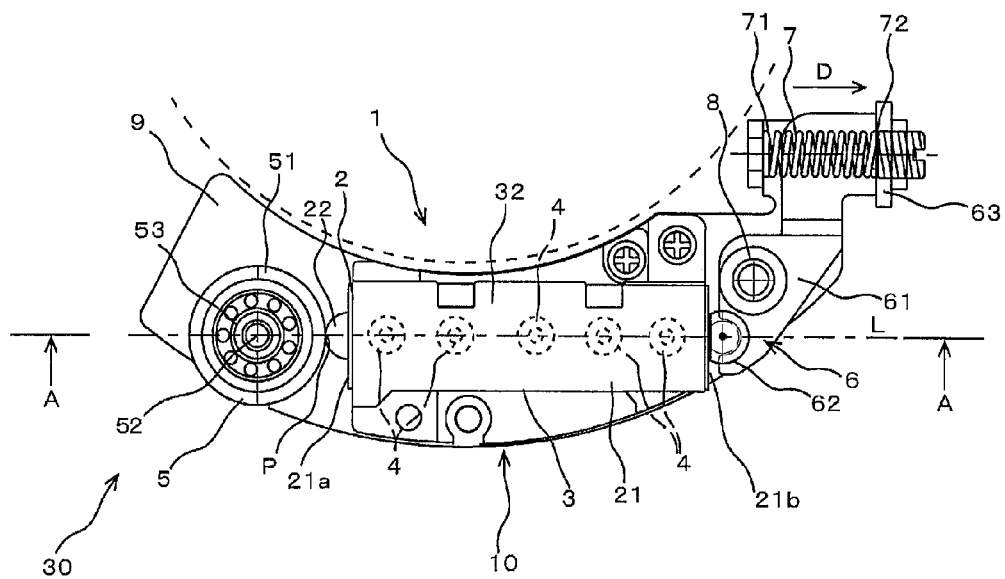
FIG. 1 is a plan view illustrating one embodiment of an oscillator holding mechanism according to the present invention.

As a result of intense study, the present inventors have achieved the object described above by employing an oscillator holding mechanism, an oscillation motor, and a lens driving device described below.

An oscillator holding mechanism according to the present invention is equipped in an oscillation motor in which a driving force is generated by transmitting a movement generated by making an oscillator vibrate to a driven body in contact with the oscillator, comprising: an oscillator that has a protruding output section on one end and generates a predetermined movement in the output section by vibration; a holding member that holds and accommodates the oscillator; and a buffer member that is made of an elastic material and is provided between the oscillator and the holding member, wherein in the buffer member, a first surface in contact with the holding member has a larger area than a second surface in contact with the oscillator, and a cross sectional shape including a center axis that connects a center point of the first surface and a center point of the second surface is axisymmetric with respect to the center axis, wherein at least one buffer member is provided between the oscillator and the holding member, and the oscillator is accommodated in the holding member so as to be held in a state in which a preferable vibration can be generated in the oscillator.

In the oscillator holding mechanism according to the present invention, the oscillator has an oscillator main body having a substantially rectangular solid shape, and the output section protrudes from a side surface of the oscillator main body on one end side, a line passing through a center point of the movement generated in the output section and perpendicular to a contact surface of the driven body with the output section is referred as a reference line L, and the buffer member may be arranged at a position where the center axis is at 90 degrees at the reference line.

In the oscillator holding mechanism according to the present invention, the buffer member may have a substantially conical frustum shape.

In the oscillator holding mechanism according to the present invention, a ratio of an area S1 of the first surface to an area S2 of the second surface of the buffer member (S1/S2) may be 1.5 to 4.

In the oscillator holding mechanism according to the present invention, the buffer member may be a conical coil spring.

In the oscillator holding mechanism according to the present invention, the first surface of the buffer member may be fixed to the holding member by an elastic resin component.

An oscillation motor according to the present invention comprises the oscillator holding mechanism described above.

A lens driving device according to the present invention is equipped with the oscillation motor comprising the oscillator holding mechanism described above as a driving source for lens traveling.

The oscillator holding mechanism according to the present invention can make the vibration of the oscillator in an appropriate state last since a buffer member having above feature is provided between the oscillator and the holding member in the oscillation motor. In addition, the influence of a needless movement generated in the output shaft of the oscillator is reduced and an unfavorable rotational force of the output shaft does not affect on vibration control of the oscillator. As a result, driving efficiency can be optimized by reducing driving fluctuation in the oscillation motor. The influence of deviations in accuracy in finishing of components can be also eliminated.

The oscillation motor according to the present invention comprises the oscillator holding mechanism that holds the oscillator vibratably in an appropriate state. Thus, the oscillation motor without driving fluctuation and excellent in driving efficiency can be provided. The lens driving device according to the present invention is equipped with the oscillation motor having excellent driving efficiency. Therefore, power consumption is reduced, and control of a lens traveling can be accurately performed.

DETAILED DESCRIPTION OF THE PREFERRED EMBODIMENTS

In the following, a preferred embodiment of the oscillator holding mechanism, the oscillation motor, and the lens driving device according to the present invention will be demonstrated.

The oscillator holding mechanism according to the present invention is equipped in the oscillation motor. The oscillation motor generates a driving force by transmitting a movement generated by making the oscillator vibrate to a driven body in contact with the oscillator. FIG. 1 is a plan view illustrating one embodiment of the oscillator holding mechanism 1 according to the present invention. FIG. 1 shows an example in which the oscillation motor 10 comprising the oscillator holding mechanism 1 according to the present invention is equipped in a lens driving device 30 that makes an image pickup lens travel, and is arranged on the outer peripheral side of the lens. The oscillator holding mechanism 1 according to the present invention comprises the oscillator 2, a holding member 3, and a buffer member 4, wherein the oscillator 2 is accommodated in the holding member 3 at least one buffer member 4 is provided between the oscillator 2 and the holding member 3 to make the oscillator 2 be held in a state in which a preferable vibration can be generated in the oscillator 2.

Figure 2:
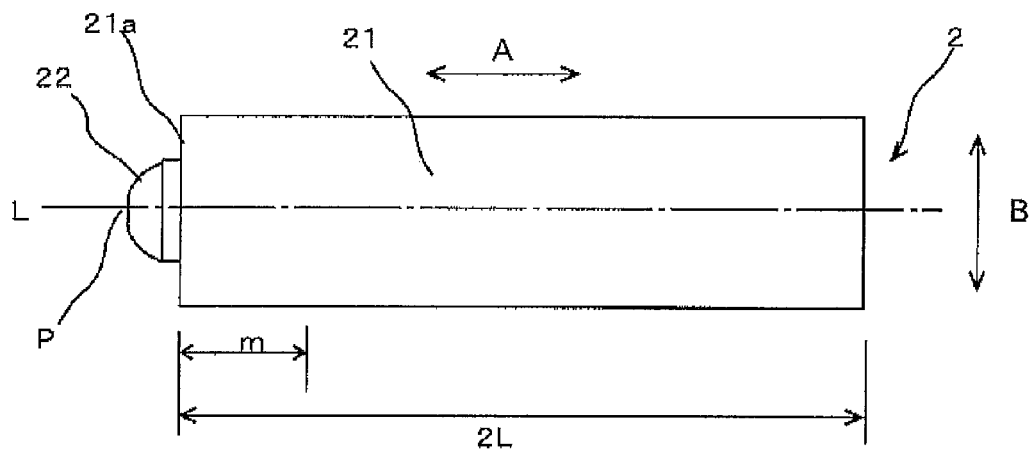
FIG. 2 is a schematic view illustrating the outer shape of an oscillator.

FIG. 2 is a plan view illustrating one example of the shape of the oscillator 2. The oscillator 2 has a protruding output section 22 on the one side surface 21a on one end side of the oscillator main body 21. In the oscillator 2, a plurality of electrodes (not shown) is connected to a piezoelectric element. When a predetermined alternating-current voltage is applied to the respective electrodes, an expansion and contraction movement (a primary longitudinal vibration) in the direction of an arrow A and a bending vibration in the direction of an arrow B in FIG. 2 are generated in the oscillator main body 21. When the primary longitudinal vibration and the bending vibration are combined by setting the frequencies of the respective electrodes to be the same value, but differentiating the phases thereof by a predetermined degree, a predetermined movement such as an elliptical movement and/or a horizontal reciprocating movement can be generated in the output section 22. The present embodiment exemplifies the oscillator main body 21 having a substantially rectangular plate-like shape, and the elliptical movement is generated at a point P of the output section 22 that is formed protruding from the one side surface 21a.

In the oscillator 2, the point P of the output section 22 is set as the center of the movement generated in the output section 22 and a line passing through the center point P of the output section 22 and perpendicular to a contact surface of a driven body 5 with the output section 22 is referred as a reference line L. Then the longitudinal vibration and the bending vibration of the oscillator main body 21 are combined on the reference line L, and converted into the movement of the output section 22.

The holding member 3 accommodates the oscillator 2 while holding the oscillator 2 in a vibratable state. As shown in FIG. 1, the output section 22 of the oscillator 2 is made pressure-contact to the driven body 5 by the oscillator main body 21 being pressed toward the driven body 5 by a press mechanism 6. Thus, the holding member 3 accommodates the oscillator main body 21 in the state that the output section 22, the one side surface 21a having the output section 22 and the other side surface 21b on the opposite side are exposed. In the plan view example shown in the FIG. 1, the oscillator 2 is held in a state in which the one side surface 21a of the oscillator main body 21 on the output section 22 side and its periphery, and the other side surface 21b on the opposite side from the output section 22 are exposed, and the other surfaces are almost covered by the holding member 3.

Figure 3:
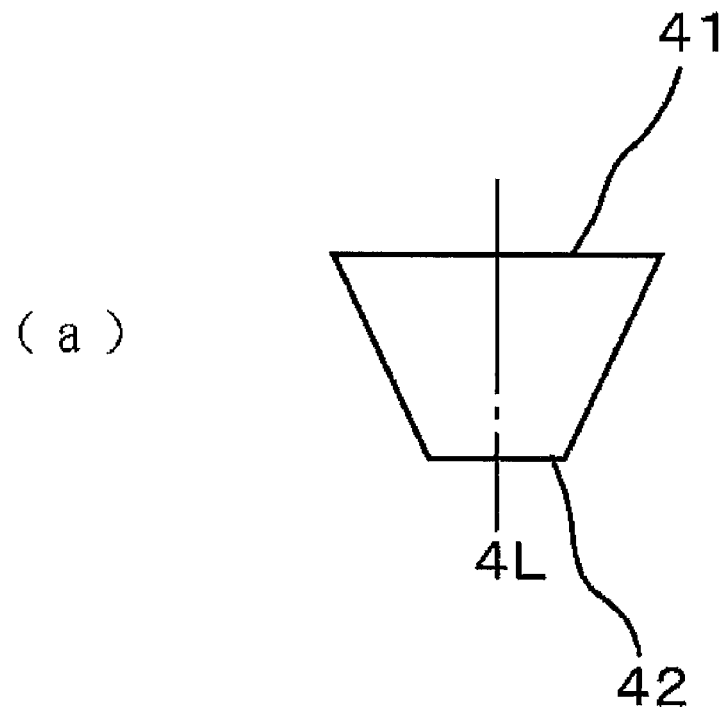
FIG. 3 are schematic views illustrating the outer shape of a buffer member.
Figure 3:
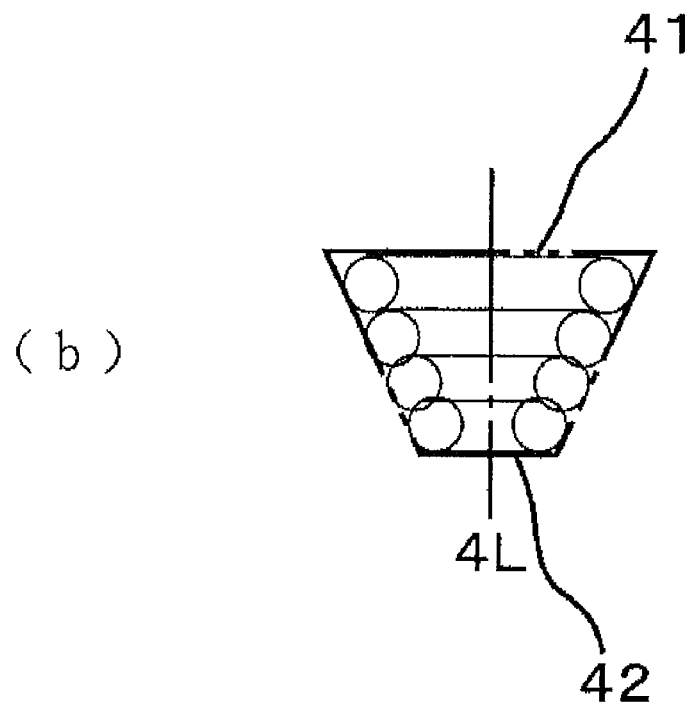

Next, the buffer member 4 is made of an elastic material such as a rubber, a spring, an elastic resin component or the like to buffer the vibration of the oscillator 2 held by the holding member 3 and is provided between the oscillator 2 and the holding member 3 as shown in FIG. 1. FIG. 3 is schematic views for demonstrating the shape of the buffer member 4. The buffer member 4 has a first surface 41 in contact with the holding member 3 and a second surface 42 in contact with the oscillator 2. As shown in FIG. 3(*a*), the first surface 41 of the buffer member 4 has a larger area than the second surface 42, and a cross sectional shape including a center axis 4L that connects the center point of the first surface 41 and the center point of the second surface 42 is axisymmetric with respect to the center axis 4L. The outer shape of the buffer member 4 may be a conical frustum shape or a square frustum shape, for example. The conical frustum shape is most preferable since effect of the holding member 3 stably hold the oscillator 2 is excellent.

Furthermore, when the ratio of an area S1 of the first surface 41 to an area S2 of the second surface 42 of the buffer member 4 is set to S1/S2=1.5 to 4, effect of the holding member 3 stably hold the oscillator 2 is further excellent. When the value S1/S2 is less than 1.5, effect to improve driving efficiency is lost. In contrast, when the value S1/S2 exceeds 4, it is made hard to keep the state in which the buffer member 4 is appropriately provided between the holding member 3 and the oscillator 2.

When a spring is employed as the buffer member 4, the condition on the shape of the buffer member 4 that the cross sectional shape including the center axis 4L that connects a center point of the first surface 41 and a center point of the second surface 42 is axisymmetric with respect to the center axis 4L is not satisfied in a narrow sense. However, the specification of the shape of the buffer member 4 in the present invention refers to the outer shape. Thus, for example, when a conical spring is used as the buffer member 4, the conical spring is axisymmetric in view of the outer shape indicated by a virtual line in FIG. 3(*b*). The sizes of the first surface 41 and the second surface 42 are specified by virtual line of the spring outer periphery at the first surface 41 and the second surface 42.

Figure 4:
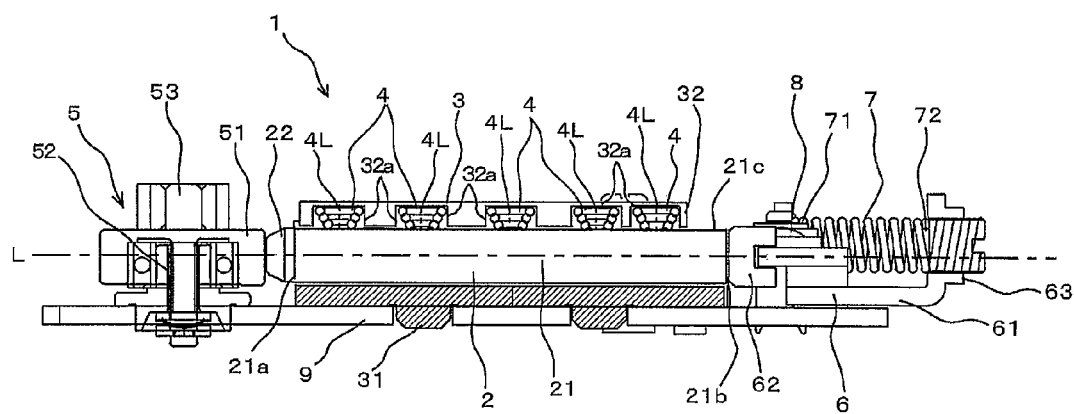
FIG. 4 is a cross sectional view cut along a line A-A in FIG. 1.

Next, the configuration of the oscillator holding mechanism 1 according to the present invention will be demonstrated. In the oscillator holding mechanism 1 according to the present invention, at least one buffer member 4 is provided between the oscillator 2 and the holding member 3, and the oscillator 2 is held in the holding member 3 in a state in which a preferable vibration can be generated in the oscillator 2. FIG. 4 is a cross sectional view cut along a line A-A in FIG. 1. In the example shown in FIGS. 1 and 4, five buffer members 4 composed of the conical springs are arranged on an upper surface 21c of the oscillator 2. The buffer members 4 are arranged at positions lined in series on the reference line L and where the center axes 4L of the respective buffer members 4 are at 90 degrees at the reference line L as shown in FIG. 1. When the buffer members 4 are provided at the positions between the oscillator 2 and the holding member 3 and where the center axes 4L of the buffer members 4 are at 90 degrees at the reference line L as described above, the oscillator 2 can be held with the buffer members 4 not to disturb the preferable vibration.

In addition, when at least one buffer member 4 is arranged within a range in which a distance m from the one side surface 21a of the oscillator 2 on the output section 22 side on the reference line L is ⅓ to ⅕ of an entire length 2L of the oscillator 2, or in the center of the entire length 2L as shown in FIG. 2, a needless vibration in the oscillator 2 can be reduced. In this case, the center axis 4L of the buffer member 4 may be positioned within the range up to the distance m. The buffer member 4 is also provided at a node position of the bending vibration not to disturb the bending vibration generated in the oscillator 2.

Figure 5:
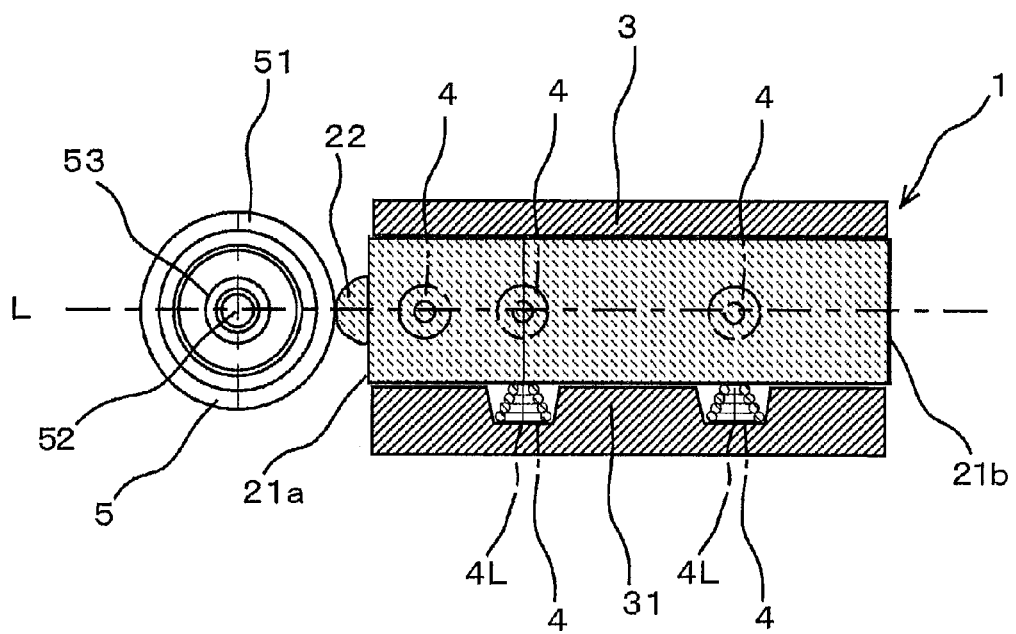
FIG. 5 is a plan view illustrating one embodiment of an oscillator holding mechanism according to the present invention.

FIG. 5 exemplifies another arrangement of the buffer member 4. FIG. 5 shows an example in which three buffer members 4 are provided on the upper surface of the oscillator main body 21, and two buffer members 4 are also provided on a side surface of the oscillator main body 21 at positions where the center axes 4L of the buffer members 4 are perpendicular at the reference line L.

Since the buffer member 4 is provided with compression to some extent in a gap between the holding member 3 and the oscillator 2, the buffer member 4 hardly slide. However, when the buffer member 4 is displaced during assembly, or due to accidental vibrations or impacts, a product is made defective. To avoid such problems, it is recommended that a buffer member accommodating section 32a which shape is fit to the first surface 41 of the buffer member 4 is provided in the holding member 3 as shown in FIG. 4. When the first surface 41 of the buffer member 4 is provided in the buffer member accommodating section 32a, the buffer member 4 is easily attached, and the position of the buffer member 4 may hardly slide.

The first surface 41 of the buffer member 4 may be also fixed to the holding member 3 by using an elastic resin components selected from silicon-functional resin, rubber based resin or acrylic urethane functional resin. An elastic resin component preferably used is excellent in adhesion to the holding member 3 when the oscillator holding mechanism 1 is under assembly and absorbs the vibration to some extent. For example, an elastic resin component such as an adhesive which is excellent in fluidity during assembly and is then cured in the state where the holding member 3 and the buffer member 4 are bonded may be employed. By using the elastic resin component, a contact state between the second surface 42 of the buffer member 4 and the oscillator 2 are stably maintained, and the driving efficiency can be made more excellent.

Next, the oscillation motor 10 according to the present invention will be demonstrated. The oscillation motor 10 according to the present invention comprises the above oscillator holding mechanism 1 according to the present invention. FIG. 1 shows the example in which the oscillation motor 10 according to the present invention is equipped in the lens driving device 30 that makes an image pickup lens travel.

As shown in FIGS. 1 and 4, in the oscillator 2 of the oscillation motor 10, the output section 22 provided on the one side surface 21a is arranged at a position contact to the driven body 5, and the press mechanism 6 is arranged in contact with the other side surface 21b. The driven body 5 and the press mechanism 6 are respectively mounted to a base member 9. The oscillator 2 is held in the holding member 3 mounted to the base member 9.

The holding member 3 is constituted with a first member 31 that surrounds three side surfaces of the oscillator main body 21 parallel to the reference line L, and a second member 32 that covers the left one surface of the oscillator 2 arranged in the first member 31. A plurality of buffer member accommodating sections 32a are provided in the second member 32 on a surface opposing the oscillator 2 as shown in FIG. 4. Each of the buffer member accommodating sections 32a is composed of a cylindrical groove shallower than the height of the buffer member 4 and fit to the shape of the first surface 41 of the buffer member 4. The oscillator 2 is arranged in the first member 31 of the holding member 3 and the conical springs 4 are respectively inserted in the buffer member accommodating sections 32a of the second member 32, and then the second member 32 of the holding member 3 is fixed to the base member 9. Here, the buffer members 4 are in contact with the oscillator 2, and the second member 32 of the holding member 3 is apart from the oscillator 2 with narrow space. As shown in FIG. 1, the oscillator 2 is arranged in contact with an outer peripheral surface of a drive transmission section 51 of the driven body 5 on the reference line L passing through the center point P of the movement generated in the output section 22 and the center of a fixing shaft 52 of the driven body 5, and is held in the holding member 3.

The driven body 5 is a movable member driven due to the movement transmitted from the output section 22 of the oscillator 2. In the example shown in FIGS. 1 and 4, the drive transmission section 51 whose outer shape is substantially cylindrical and rotatable around the fixing shaft 52 is mounted to the base member 9. The output section 22 of the oscillator 2 is made pressure-contact to the drive transmission section 51. When the output section 22 performs a predetermined movement, the drive transmission section 51 is made rotate by a frictional force between the output section 22 and the drive transmission section 51. When a driving force output section 53 is made rotate in conjunction with the drive transmission section 51, a lens driving mechanism (not shown) connected to the driving force output section 53 acts as a driving source of the lens driving device. By the way, the driven body 5 may be a driven object itself directly driven by the oscillation motor 10, or may be an intermediate member which transmits the driving force to a driven object.

Next, the press mechanism 6 presses the oscillator 2 toward the driven body 5 on the other side surface 21b of the oscillator 2 on the other end side. In the present embodiment, the press mechanism 6 comprises a pressure source 7, a pressure transmission section 61, and a press direction correcting section 62, and is arranged on the other side surface 21b of the oscillator 2 on the opposite side from the output section 22 as shown in FIGS. 1 and 4. The pressure source 7 is composed of a spring coil. The pressure source 7 is arranged at a position apart from the oscillator 2 and where an expansion and contraction direction of the coil spring is made parallel to the reference line L. One end portion 71 of the pressure source 7 is fixed to the base member 9, and the other end portion 72 is connected to the pressure transmission section 61.

The pressure transmission section 61 of the press mechanism 6 is a member that transmits a press force of the pressure source 7 to the oscillator 2. In the present embodiment, the pressure transmission section 61 is an arm-like member mounted to the base member 9 via a support shaft 8 and rotatable around the support shaft 8. Because the pressure transmission section 61 is connected to the pressure source 7 via a pressure source connection section 63, when a force in the direction of an arrow D is applied to the pressure source connection section 63, the pressure transmission section 61 is made rotate around the support shaft 8 to apply a force in a direction in which an end portion of the pressure transmission section 61 opposing the oscillator 2 approaches to the oscillator 2. As a result, a force to press the oscillator 2 toward the driven body 5 is generated in the press mechanism 6.

The press mechanism 6 further comprises the press direction correcting section 62 made of engineering plastic and rotatably provided at a contact position with the oscillator 2. As shown in FIGS. 1 and 4, when the rotatable press direction correcting section 62 is provided between the pressure transmission section 61 and the other side surface 21b of the oscillator 2, the press direction correcting section 62 can correct the direction of a pressing force of the pressure transmission section 61 with respect to the other side surface 21b of the oscillator 2. Then, a pressure in a predetermined direction is applied to the oscillator 2. As a result, the oscillator 2 can be stably brought into pressure-contact with the driven body 5 in an appropriate direction. A buffer effect can be also obtained when the force between the pressure transmission section 61 and the oscillator 2 is fluctuated.

Next, the lens driving device 30 according to the present invention will be demonstrated. As shown in FIG. 1, the lens driving device 30 according to the present invention comprises the oscillation motor 10 on the outer peripheral side of a lens as the driving source for making the lens travel in an optical axis direction. As described above, since the lens driving device 30 according to the present invention is provided with the oscillation motor 10 comprising the oscillator holding mechanism 1, the lens driving device 30 can generate an appropriate vibration in the oscillator 2. The oscillation motor is preferably used as the driving source of the lens driving device which requires accuracy in fine adjustment since the movement generated in the output section 22 is uniform and the driving efficiency is good.

The oscillator holding mechanism according to the present invention can hold the oscillator equipped in the oscillation motor without generation of a needless vibration in the oscillator. So, the oscillation motor is excellent in driving efficiency, and can make driving control performance excellent. Thus, the oscillator holding mechanism is effectively equipped in a lens driving device where quick response in zooming or focusing is required such as a movie shooting camera. In addition, an operation period of time can be prolonged in a battery-operated camera or the like when the oscillator holding mechanism is equipped in a lens driving device, since the oscillator holding mechanism is excellent in driving efficiency.

What is claimed is:

1. An oscillator holding mechanism equipped in an oscillation motor in which a driving force is generated by transmitting a movement generated by making an oscillator vibrate to a driven body in contact with the oscillator, comprising:
   an oscillator that has a protruding output section on one end and generates a predetermined movement in the output section by vibration;
   a holding member that holds and accommodates the oscillator; and
   a buffer member that is made of an elastic material and is provided between the oscillator and the holding member,
   wherein in the buffer member, a first surface in contact with the holding member has a larger area than a second surface in contact with the oscillator, and a cross sectional shape including a center axis that connects a center point of the first surface and a center point of the second surface is axisymmetric with respect to the center axis,
   wherein at least the one buffer member is provided between the oscillator and the holding member, and the oscillator is accommodated in the holding member so as to be held in a state in which a vibration is generated in the oscillator.

2. The oscillator holding mechanism according to claim 1, wherein the oscillator has an oscillator main body having a substantially rectangular solid shape, and the output section protrudes from a side surface of the oscillator main body on one end side, a reference line passing through a center point of the movement generated in the output section and perpendicular to a contact surface of the driven body with the output section, and the buffer member is arranged at a position where the center axis is at 90 degrees at the reference line.

3. The oscillator holding mechanism according to claim 1, wherein the buffer member has a substantially conical frustum shape.

4. The oscillator holding mechanism according to claim 1, wherein a ratio of an area of the first surface to an area of the second surface of the buffer member is 1.5 to 4.

5. The oscillator holding mechanism according to claim 1, wherein the buffer member is a conical coil spring.

6. The oscillator holding mechanism according to claim 1, wherein the first surface of the buffer member is fixed to the holding member by an elastic resin component.

7. An oscillation motor comprising the oscillator holding mechanism according to claim 1.

8. A lens driving device equipped with the oscillation motor according to claim 7 as a driving source for lens traveling.

* * * * *